United States Patent [19]

Tracey et al.

[11] 3,864,529

[45] Feb. 4, 1975

[54] RECEIVER FOR DECODING DUOBINARY SIGNALS

[75] Inventors: Robert J. Tracey; Robert P. Lombaerde, both of San Mateo, Calif.

[73] Assignee: Lynch Communication Systems, Inc., San Francisco, Calif.

[22] Filed: Sept. 14, 1972

[21] Appl. No.: 288,968

[52] U.S. Cl. ...... 178/69.5 R, 179/15 BS, 325/38 A, 328/151

[51] Int. Cl. ........ H04l 7/02

[58] Field of Search ........ 325/38 A; 179/15 BS; 307/210, 269; 328/63, 151, 155; 178/69.5 R

[56] References Cited

UNITED STATES PATENTS

| | | | |
|---|---|---|---|
| 2,401,405 | 6/1946 | Bedford | 179/15 BS |
| 3,238,299 | 3/1966 | Lender | 325/38 A |
| 3,303,284 | 2/1967 | Lender | 179/15 BS |
| 3,337,864 | 8/1967 | Lender | 325/38 A |
| 3,355,550 | 11/1967 | Lemiere et al. | 179/15 BS |
| 3,510,585 | 5/1970 | Stone | 178/66 R |
| 3,585,298 | 6/1971 | Liberman | 179/69.5 R |
| 3,599,103 | 8/1971 | Nussbaumer et al. | 328/63 |
| 3,707,683 | 12/1972 | Dotter | 307/269 |

*Primary Examiner*—Thomas J. Sloyan
*Attorney, Agent, or Firm*—Phillips, Moore, Weissenberger, Lempio & Strabala

[57] ABSTRACT

A receiver for converting duobinary signals to binary data is provided with self-correcting gain and DC level controls which are operated by integrated digital correction signals derived from the amplitude of the sample itself. Sample timing control is accomplished by similar integrated correction signals derived by determining the position of the duobinary signal transition with respect to the center sample of a three-sample ±1, 0, ∓1 sequence.

13 Claims, 6 Drawing Figures

RECEIVER FOR DECODING DUOBINARY SIGNALS

BACKGROUND OF THE INVENTION

In a receiver for the decoding of data received in the form of a pulse train, the data is conventionally presented to the decoder in duobinary form, i.e., in the form of a signal whose waveform is determined by certain mathematical principles relating to the bit sequence of the pulse train. If a large number of cycles of this analog signal are superimposed upon one another on an oscilloscope screen, the resulting pattern is known as an "eye" pattern. The data contained in the signal can be decoded by sampling the signal during each cycle at the instant corresponding to the node of the "eye" and determining whether the signal at that instant is ∓1, 0, or ±1.

A problem arises in apparatus of this kind in relation to the sampling accuracy. Incorrect amplitude of the "eye," a DC offset, or an inaccuracy in the sampling time increases the error rate of the receiver in the presence of noise. Precise control of amplitude, DC level and timing is therefore imperative for the optimum functioning of the apparatus.

Typically, prior art systems used peak detection methods to derive correction signals. Inasmuch as the peaks of the "eye" pattern occur between the nodes, distortion of the signal was apt to result in erroneous gain. In addition, prior art timing recovery systems, in the presence of distortion, sometimes did not sample at the optimum point.

SUMMARY OF THE INVENTION

The present invention provides simple, foolproof control of the critical parameters by using the duobinary signal samples themselves to generate continuous digital corrective feedback signals which maintain the amplitude, DC level, and timing of the duobinary signal at predetermined norms for accurate sampling.

Specifically, for a signal whose amplitude at the time of sampling can properly be only +1, 0, or −1, the amplitude scale is divided into six zones (> 1, < 1 but > ½, > 0 but <½, <0 but > −½, > −1 but < −½, and < −1). If the amplitude at sampling is in an odd zone, a "decrease DC" signal is generated. If the sample amplitude is in an even zone, an "increase DC" signal is generated. The DC control signals are integrated over a period of time to average out the effect of noise, and to produce a smooth DC control signal.

If the signal is found to be a logic "1" (±1) when sampled but lies in any of zones 2 through 5, an "increase gain" signal is generated. If, under the same circumstances, the signal is in zone 1 or 6, a "decrease gain" signal is generated. If the signal is found to be logic "0," no valid gain information is present, and a "hold gain" signal is generated. Integration again averages out noise and distortion, and translates these control signals into a smooth gain control signal.

To determine proper timing, the circuit locates a +1, 0, −1 or −1, 0, +1 sequence in three successive samplings of the signal. If, in such a sequence, the sign of the analog signal does not change between the second and third samples, a "shift clock phase backward" signal is generated. If the sign does change between the second and third samples, a "shift clock phase forward" signal is generated. During other sequences, the sign of the signal is inconclusive, and a "hold clock phase" signal is generated. As with the other control signals, integration averages out the effect of noise and distortion, and provides a smooth clock control signal which keeps the sample precisely at the node of the "eye."

Although the algorithms for the gain and DC level signals are generally applicable to any standard data format, the algorithm for the timing signal is restricted to a duobinary system; consequently, the invention is described herein in terms of a duobinary-to-digital converter.

It is thus the object of the invention to provide a receiver for digitally decoding duobinary signals in which the amplitude of the duobinary signal samples themselves is used to generate digital corrective signals which continuously maintain the gain, DC level, and timing at their correct values.

It is another object of the invention to digitally determine the position of a zero crossing of a duobinary signal by comparing its sign at a selected pair of successive samples, and to derive a timing correction signal form that comparison to keep the sampling strobe centered on the node of the duobinary "eye" pattern.

DESCRIPTION OF THE PREFERRED EMBODIMENT

Figure 1B:
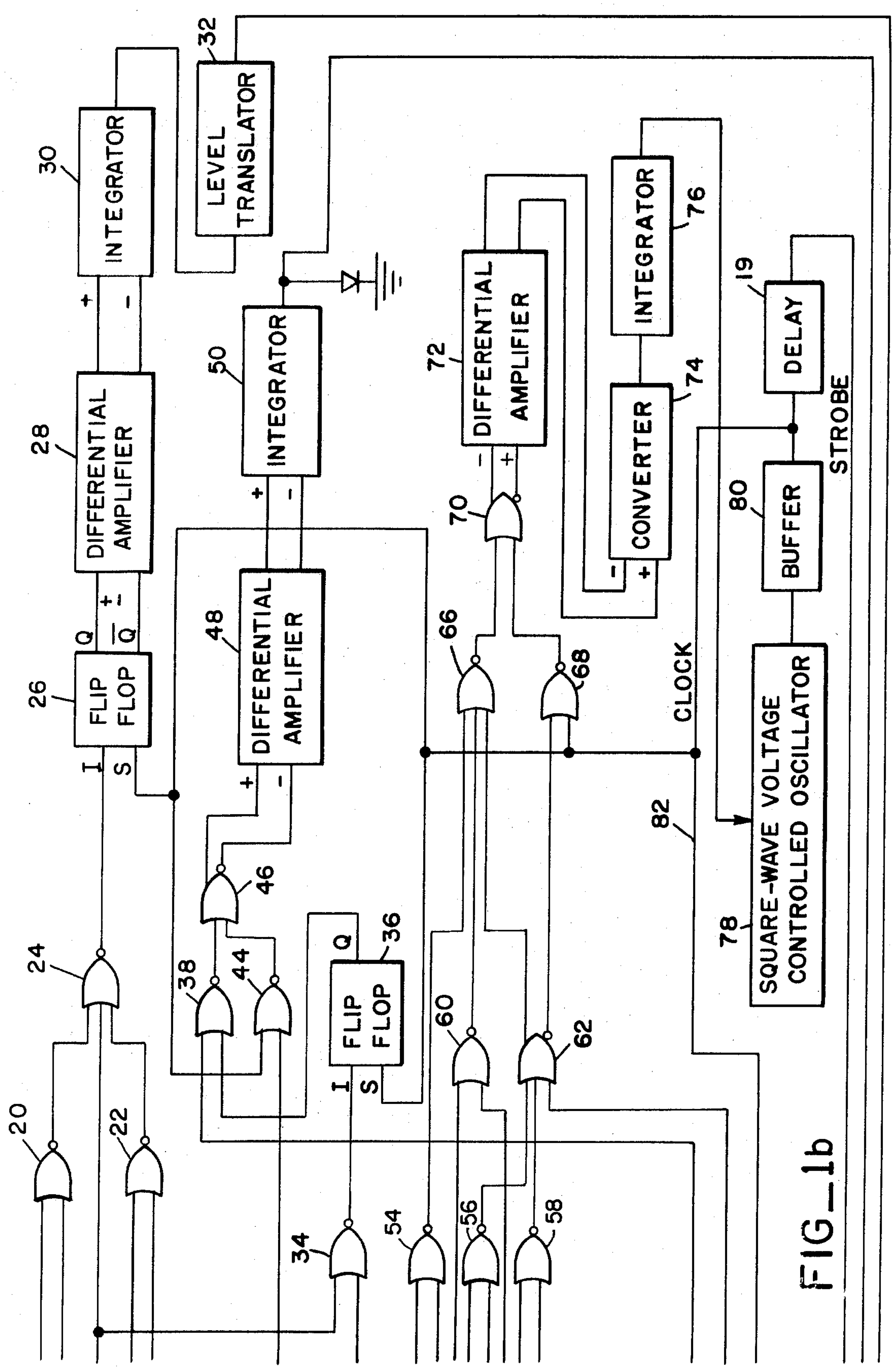
FIGS. 1*a* and 1*b* are a circuit diagram on two sheets, partly in block form, of the receiver of this invention.
Figure 1A:
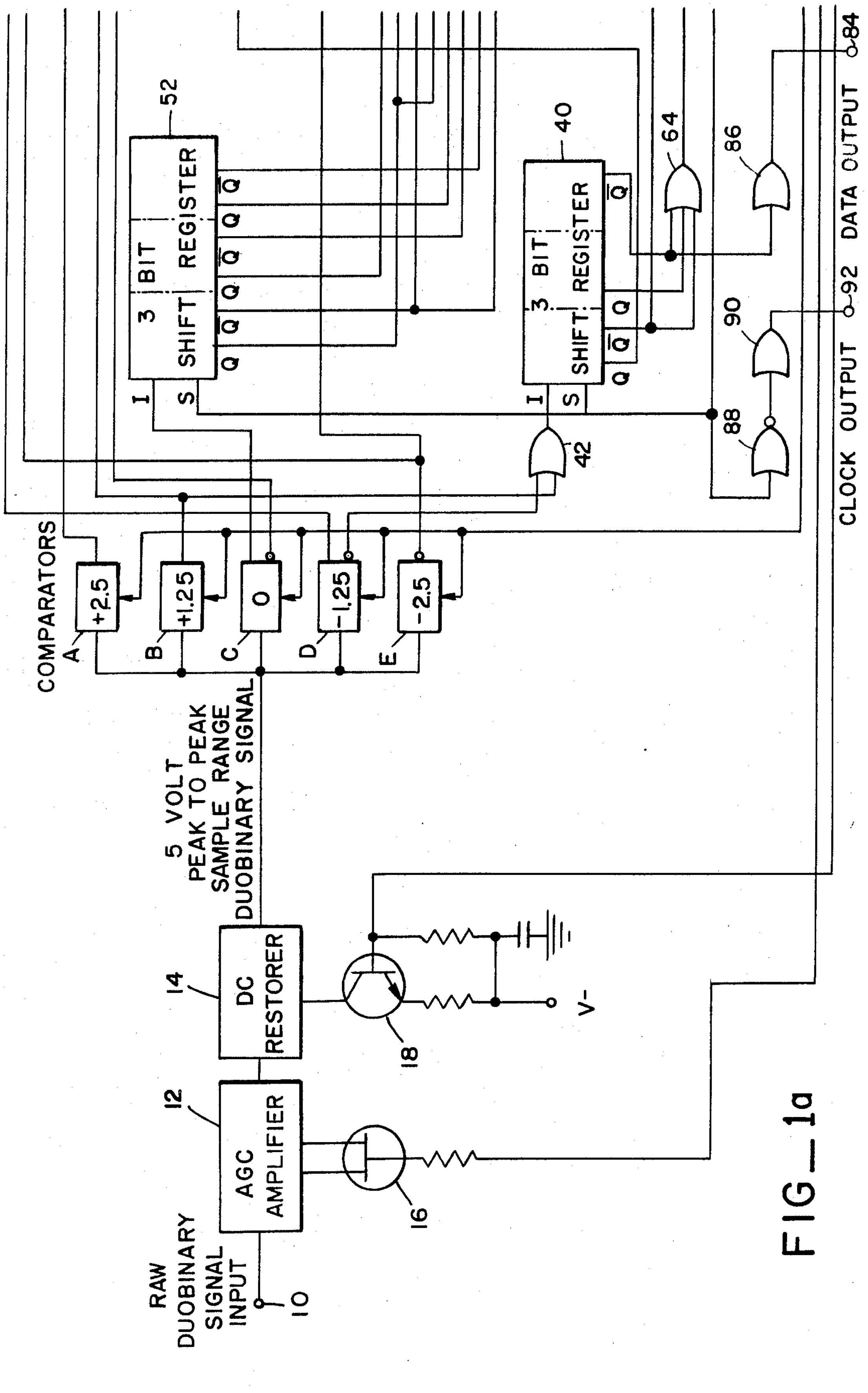
Figure 2:
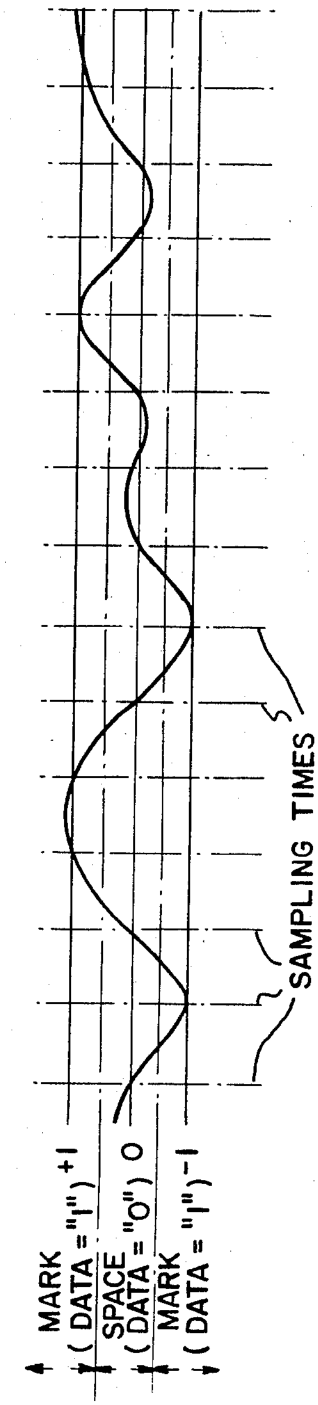
FIG. 2 is a graphical representation of the duobinary input signal to the receiver of this invention.

In FIGS. 1*a* and 1*b* the raw duobinary input signal fed to the receiver of this invention at the signal input 10 is of the configuration shown in FIG. 2. The mathematical relationships which produce the waveform of FIG. 2 are such that if the signal of FIG. 2 is sampled at the points indicated by vertical lines in FIG. 2, the samples will be representative of the pulse-coded data from which the duobinary signal was derived.

The input signal at 10 may typically be about twenty db down from IV peak-to-peak, and may be subject to some distortion and amplitude variations. Consequently, in order to obtain a properly calibrated duobinary signal suitable for accurate sampling, the raw input signal must be amplified with a controlled amount of gain, and its DC level must be controlled so as to obtain a precise "0" level for the signal. These functions are performed, respectively, by the AGC amplifier 12 and the DC restorer 14.

The gain of the AGC amplifier 12 is controlled by the gate voltage of field effect transitor 16. The FET 16 acts as a variable resistor whose resistance is proportional to its gate voltage. Likewise, the DC level of DC restorer 14 is controlled by the DC base voltage applied to control transistor 18. Both of these control methods are, of course, conventional.

Figure 4:
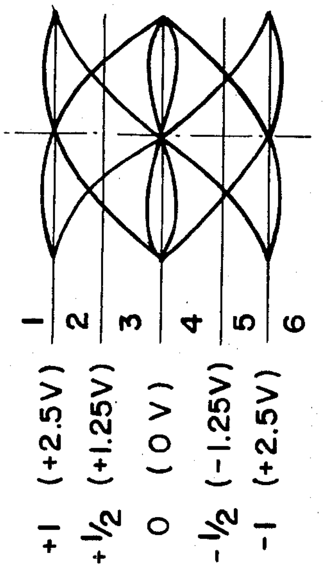
FIG. 4 is a portion of the "eye" pattern showing the comparison levels and zones used in determining the proper correction signals to be produced.
Figure 3:
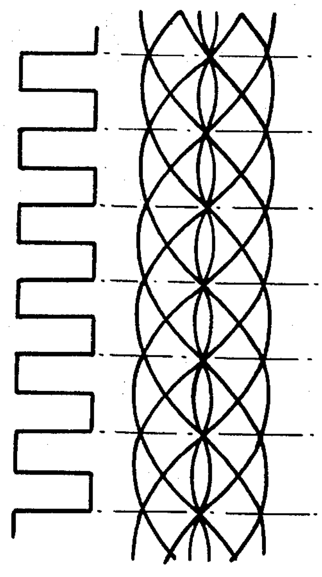
FIG. 3 is a graphical representation of the "eye" pattern representing the superposition of all possible waveforms of the duobinary signal, with the clock and strobe signals shown in proper time relationship therewith.

The nature of a duobinary signal is such that, when a large number of cycles of the signal are superimposed upon one another, as on an oscilloscope screen, the so-called "eye" pattern of FIGS. 3 and 4 is formed. The "eye" pattern represents the locus of all possible combinations of logic "1" and logic "0" sequences which the data pulse train can contain. It will be seen that if the signal is sampled at the nodes of the "eye" (i.e., at the falling edges of the clock signal in FIG. 3), the sample can only be +1, 0, or −1. A logic "1" of the data corresponds to a sample of ±1, while a logic "0" of the data corresponds to a sample of 0. In the receiver of this invention, the AGC amplifier 12 is preferably calibrated in such a manner that a sample of ±1 corresponds to ±2.5 volts from a 0-volt DC reference level.

The output of DC restorer 14 is thus a duobinary signal whose nominal peak-to-peak sampling amplitude at the node is ±2.5 volts. Inasmuch as the peak amplitude of the signal occurs half way between the nodes, the actual peak-to-peak amplitude of the entire signal (as opposed to the samples) is somewhat higher. This latter peak-to-peak value is used for signal correction in prior art devices, but because of its greater vulnerability to distortion, it is not used in the receiver of this invention.

Referring now to FIG. 4, the entire range of possible signal levels in the "eye" is divided into six zones numbered 1 through 6. The signal from the output of DC restorer 14 is presented to a bank of five comparators designated A, B, C, D, and E in FIGS. 1*a* and 1*b*. The comparators are sampled at each falling edge of the strobe pulse train appearing at the output of delay line 19 as hereinafter described, and are then held as long as the strobe signal is "0" to provide an indication of the amplitude zone in which the signal is at the moment of the sampling. The zone thus detected determines the nature of the corrective signals which the apparatus must produce, as explained below.

DC level control

An examination of FIG. 4 will readily show that, assuming the AGC is properly set and that no distortion or noise are present, the signal level at the moment of sampling must be precisely on the dividing line between zones 1 and 2, 3 and 4, or 5 and 6. If the sample is in zone 1, 3, or 5, the DC level is too high; conversely, if the sample is in zone 2, 4, or 6, the DC level is too low.

NOR gates 20, 22 and 24 provide the necessary logic for producing a "1" at the input I of flip-flop 26, during the rising edge of the clock pulse at the set input S, whenever the sample is in an even zone. NOR gate 20 combines D and $\overline{E}$ comparator outputs into a "zone 5" pulse, while NOR gate 22 combines B and $\overline{C}$ comparator outputs into a "zone 3" pulse. NOR gate 24, in turn, combines the "zone 1," (i.e., A comparator output), "zone 3," and "zone 5" pulses into an "even zone" pulse which is fed to terminal I of flip-flop 26.

Flip-flop 26, like the other flip-flops in FIGS. 1*a* and 1*b*, is triggered by the rising edges of the clock signal applied to its set terminal S. It holds the "0" or "1" indication appearing at its input terminal I at each rising edge until the next rising edge of the clock signal. Inasmuch as the clock signal, due to the action of delay line 19, rises a few nanoseconds before the strobe signal, each rising edge of the clock signal records in flip-flop 26 the sample obtained at the preceding falling edge of the strobe signal. The Q and $\overline{Q}$ outputs of flip-flop 26 are connected, respectively, to the + and − inputs of a precision differential amplifier whose function is to produce a sufficiently large binary signal to swamp out the input offset of the integrator 30.

Inasmuch as the state of flip-flop 26 can only be "1" (signal in an even zone) or "0" (signal in an odd zone), a correctly adjusted signal will produce a random sequence containing 50 percent ones and 50 percent zeros. If the DC level of the signal drops below its nominal value, the percentage of ones in the sequence will rapidly increase; and conversely, if the DC level rises above nominal, the percentage of zeros will rapidly increase. The output of differential amplifier 28 is therefore integrated by integrator 30 over a larger number of symbols (e.g. a few thousand) to average out any random noise and produce a DC level correction signal. This integrated correction signal is then translated to above −8V center by level translator 32, and the translated correction signal is applied to the base of control transitor 18.

Gain Control

The operation of the AGC circuit is similar to that of the DC level control, but with an added complexity. If a logic "1" sample is in zone 1 or 6 in the absence of noise or distortion, the gain is too high; if it is in zone 2 or 5, the gain is too low. However, a logic "0" sample (in zone 3 or 4) does not contain any valid gain information and must be disregarded for gain control purposes.

The AGC circuit first determines whether a sample is in zone 1 or 6, or in zones 2 through 5. This determination is made by NOR gate 34, which combines A and $\overline{E}$ comparator outputs into a "zones 2 through 5" pulse which is fed to the input I of flip-flop 36. To eliminate the erroneous "increase gain" indication which a logic "0" sample would produce, a logic "0" sample is made to produce an "increase gain" indication for one-half cycle, followed by a "decrease gain" indication for the other half of the cycle, the two half-cycle indications cancelling each other in the subsequent integration.

For this purpose, the Q output of flip-flop 36 is combined in NOR gate 38 with the $\overline{Q}$ output of the left section of shift register 40. The latter Q output indicates a logic "0" sample, because the shift register input is a "zone 1 or 2, or 5 or 6" pulse produced by combining B and $\overline{D}$ comparator outputs in OR gate 42. The output of NOR gate 38 is therefore "neither zone 2-5 nor logic '0'," in other words, "zone 1 or 6."

NOR gate 44 combines the Q output of the left section of shift register 40 with the clock signal to produce a "neither logic '1' nor clock high" pulse. Finally, OR/-NOR gate 46 combines the outputs of NOR gates 38 and 44 to produce a digital gain correction pulse which appears whenever a logic "1" of excessive amplitude is sampled, and whenever the clock signal is low while a logic "0" is being sampled.

The clock signal is high during the first half of the cycle, and low during the second half of the cycle. Consequently, a logic "0" will result in a half cycle of "increase gain" followed by a half cycle of "decrease gain." A logic "1" sample of excessive amplitude, by contrast, produces a full cycle of "decrease gain."

The complementary outputs of OR-NOR gate 46 are fed to the positive and negative inputs, respectively, of differential amplifier 48, whose function is similar to that of differential amplifier 28. The output of differential amplifier 48 is processed through integrator 50, which produces a smooth gain control signal. The positive values of this signal are clamped by a diode to produce an AGC signal suitable for application to the gate electrode of FET 16.

Timing Control

Figure 5:
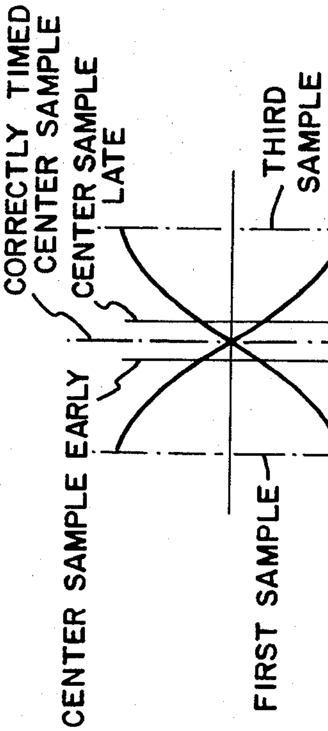
FIG. 5 is a graphic representation of a logic "1," "0," "1" sequence, showing the effect of clock phase deviations on the sign of the samples.

For maximum accuracy, it is essential that the sampling occur precisely at the center of the node. The timing control system of the inventive receiver is based on the premise that, in a transition of the signal from +1 to −1 or from −1 to +1, the signal crosses the reference axis precisely at the center of the intervening node in the absence of noise or distortion. Consequently, if in any "1," "0," "1" logic sample sequence, the signal does not change sign between the last two samples of the sequence, the center sample is too late, and the clock frequency is therefore too low; if it does, the center sample is too early, and the clock frequency is too high. This relationship is illustrated in FIG. 5.

As previously described, a "1" input to shift register 40 is produced whenever the signal is in zone 1 or 2, or 5 or 6, i.e., when the data embodied in the signal is logic "1;" otherwise, the input to shift register 40 is "0." The shift register 40 therefore always contains the data of a three-sample sequence. Whenever the contents of shift register 40 are binary 101, a transition, as shown in FIG. 5, from +1 to −1 or from −1 to +1 has occurred in the signal (in the absence of noise or distortion).

While shift register 40 is being loaded with a sequence of data information, shift register 52 is being loaded with a corresponding sequence of signal sign information from the C comparator output. The digital timing correction signal therefore depends on whether the information in the right and center sections of shift register 52 is alike or opposite while the contents of shift register 40 or 101. Whenever the contents of shift register 40 are other than 101, a self-cancelling half-cycle correction signal must be produced to hold the phase-locked timing loop in balance.

The logic involved is as follows: NOR gate 54 combines the Q outputs of the left and center sections of shift register 52 to produce a "neither second nor third sample is positive" (i.e., "second and third samples are both negative") pulse. NOR gate 56 combines the Q outputs of the left and right sections of shift register 52 to produce a "neither first nor third sample is positive" (i.e., "first and third samples are both negative") pulse. NOR gate 58 combines the $\overline{Q}$ outputs of the left and right sections to produce a "neither first nor third sample is negative" (i.e., first and third samples are both positive") pulse; and NOR gate 60 combines the $\overline{Q}$ outputs of the left and center sections to produce a "neither second nor third sample is negative" (i.e., "second and third samples are both positive") pulse. OR/NOR gate 62 combines the outputs of NOR gates 56 and 58 with the $\overline{101}$ pulse derived by OR gate 64 from shift register 40 to produce a "data is 101, and first and third samples are of opposite signs" (i.e., "valid transition is present") pulse at its NOR output, and a "no valid transition present" signal at its OR output. NOR gate 66 combnies the outputs of NOR gates 54 and 60 with the OR output of gate 62 to produce a "second and third samples are of opposite sign and valid transition is present" pulse. NOR gate 68 combines the output of NOR gate 62 with the clock signal to produce a "no valid transition present and clock is low" pulse.

The outputs of NOR gates 66 and 68 are combined in OR/NOR gate 70 to produce a digital correction signal which is high whenever the second and third samples are of opposite sign during a valid transition, or when the clock is low during invalid transitions. The complementary outputs of OR/NOR gate 70 drive differential amplifier 72 (note the polarity inversion) in such a way as to produce a negative output if the center sample is too early during a valid transition, a positive output when it is too late during a valid transition, and an alternating positive-negative output during invalid transitions. A positive output corresponds to a "shift phase backward" command, while a negative output corresponds to a "shift phase forward" command.

The output of differential amplifier 72 is converted from bipolar to unipolar form by converter 74 and is then integrated by integrator 76. The output of integrator 76 is a phase error signal which is applied to the voltage-controlled square wave oscillator 78 to control its frequency.

A buffer 80 consisting of a pair of inverters may be interposed between the output of oscillator 78 and the clock line 82. The delay line 19, which may also consist of a pair of inverters, introduces a delay of about 6 nanoseconds between the clock signal and the strobe signal to allow the flip-flops and shift registers to lock in the information from the comparators before the comparators are released for the next sampling operation.

The data output 84 from the receiver of this invention is taken from the $\overline{Q}$ output of the right section of shift register 40 and may be processed through a converter gate 86 which converts the MECL logic levels of the shift register to the TTL logic levels commonly used by outside equipment. Likewise, the clock signal on line 82 may be inverted by inverter 88 and processed through converter gate 90 to produce a TTL clock at clock output 92.

It will be noted that the self-cancelling half-cycle digital correction signal is always "0" in the first half of the cycle and "1" in the second half of the cycle. The reason for this sequence is that the loading of the flip-flop and shift registers occurs at the beginning of the first half of the cycle; hence a "1" correction signal during the first half of the cycle would be prone to cause an undesirable inequality in the two half-cycles of the self-cancelling correction signal.

The check for an invalid +1, 0, +1 or −1, 0, −1 transition (left and right sections of shift register 52 of like polarity) would be redundant except for the possibility that noise spikes may cause an erroneous 101 entry in shift register 40.

Figure 6:
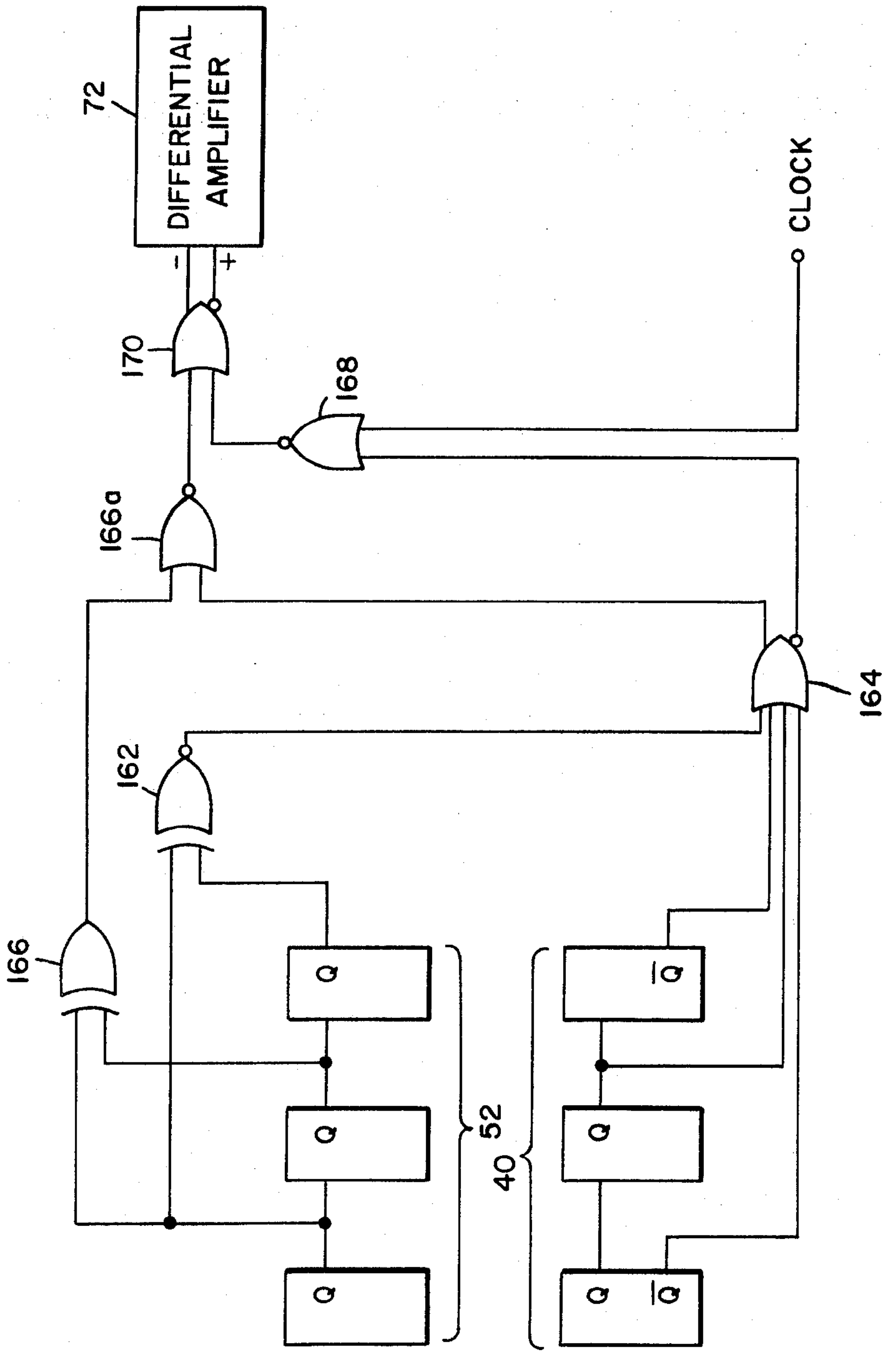
FIG. 6 is a partial block diagram showing an alternative embodiment of the timing correction logic.

Thus far, the invention has been described in terms of circuitry using only OR or NOR functions. Although this approach is usually more desirable for reasons of commercial practicality, the logic can be carried out more simply, as shown in FIG. 6, if EXCLUSIVE-OR and EXCLUSIVE-NOR gates can also be used. The logic elements of FIG. 6 are numbered to match corresponding logic elements of FIGS. 1*a* and 1*b* but with the prefix 1.

Thus, in FIG. 6, EXCLUSIVE-NOR gate 162 detects noise errors (left and right sections of shift register 52 of like sign). The "no noise error" pulse from gate 162 provides a fourth input to OR/NOR gate 164, whose OR output is a "valid transition present" pulse and whose NOR output is a "no valid transition present" pulse.

EXCLUSIVE-OR gate 166 produces a "second and third samples of opposite sign" pulse, and cooperates with NOR gate 166*a* to produce the "valid transition and center sample too early" pulse produced in FIGS. 1*a* and 1*b* by gate 66. NOR gate 168 combines the clock with the NOR output of gate 164 to produce the "no valid transition and clock low" pulse produced in FIGS. 1*a* and 1*b* by gate 68. The outputs of gates 166 and 168 are combined in OR/NOR gate 170 in the same manner as the outputs of gates 66 and 68 are combined by gate 70 in FIGS. 1*a* and 1*b* and the functioning of the circuit of FIG. 6 is the same as the functioning of the circuit of FIGS. 1*a* and 1*b* from that point on.

What is claimed is:

1. In a receiver for converting duobinary signals to binary data, a self-correcting clock circuit comprising:

a. a source of duobinary signals;
b. a source of strobe signals;
c. comparator means connected to said signal sources so as to compare the level of said duobinary signal at the node of its "eye" pattern to a plurality of predetermined reference levels;
d. clock means for producing clock pulses, said strobe signals having the same frequency as said clock pulses;
e. means for varying the frequency of said clock means;
f. binary logic means connected to said comparator means and said clock means for producing a binary timing correction output in accordance with the relation of the center sample of a sample sequence representing a ±1, 0, ∓1 transition of the duobinary analog signal to one of said reference levels; and
g. integrator means connected to said logic means for integrating said binary correction output over a substantial number of cycles;
h. the output of said integrator means being connected to said clock-frequency-varying means to vary said frequency in such a manner as to shift the phase of said strobe signals to keep them centered upon the node of the duobinary "eye."

2. The device of claim 1, in which said reference levels are 0 and ±½ of the nominal logic "1" level of the duobinary signal at said node, and in which the reference level to which said center sample is related is 0.

3. The device of claim 1, in which said logic means include first and second shift registers connected to said comparator means, said first shift register being connected to receive an input pulse whenever said duobinary signal, at the moment of sampling, is > +½ or < −½; and said second shift register being connected to receive an input pulse whenever said duobinary signal, at the moment of sampling, is > 0.

4. The device of claim 3, in which said logic means are connected to produce a timing correction output pulse one sample interval in length only whenever the contents of said first shift register are 101, and the contents of said second shift register are such as to indicate a zero-crossing of said duobinary signal just prior to the center sampling instant; and a timing correction pulse one-half sample interval in length only whenever the contents of said first shift register are other than 101.

5. The device of claim 4, in which said second shift register is a three-bit register, and in which a timing correction pulse one-half sample interval in length is also produced whenever the first and third bit of the contents of said second shift register are the same.

6. The device of claim 4, in which the zero-crossing of said duobinary signal prior to the center sampling instant is indicated by the fact that the first and second bit of said second shift register are the same.

7. The device of claim 4, in which said logic means, except for said shift registers, consist entirely of NOR and OR/NOR gates.

8. The device of claim 4, in which said logic means, except for said shift registers, consist entirely of EXCLUSIVE-OR, EXCLUSIVE-NOR, NOR, and OR/NOR gates.

9. The method of maintaining the sample timing in a duobinary to binary converter at the node of the "eye" pattern of the duobinary signal, comprising the steps of:

a. generating a clock signal by electronic apparatus;
b. generating a delayed clock signal from said clock signal by electronic apparatus;
c. electronically employing said clock signal and said delayed clock signal to sample said duobinary signal in the vicinity of successive nodes of the "eye" pattern;
d. employing electronic apparatus to compare the samples to predetermined signal level ranges to determine, for each sample, whether it is highly positive (+1), highly negative (−1), or near zero (0), to compare successive samples in groups of three to identify three-sample sequences (+1, 0, −1 or −1, 0, +1) which necessarily contain a zero transition of said doubinary signal, and to compare the center sample of each thus identified sequence to a zero signal level to determine the sign of the center sample;
e. electronically generating, for each thus identified sequence, a digital timing correction signal in accordance with the sign of the center sample in relation to the signs of the other two samples;
f. employing electronic apparatus to integrate said digital timing correction signal over a substantial number of sequences; and
g. applying said integrated timing correction signal to said electronic apparatus for generating said clock signal to vary the frequency of said clock signal.

10. The method of maintaining the sample timing in a duobinary to binary converter at the node of the "eye" pattern of the duobinary signal, comprising the steps of:

a. generating a clock signal by electronic apparatus;
b. generating a delayed clock signal from said clock signal by electronic apparatus;
c. electronically employing said clock signal and said delayed clock signal to sample said duobinary signal in the vicinity of successive nodes of the "eye" pattern;
d. employing electronic apparatus to detect a ±1, 0, ∓1 sequence in three successive samples;
e. employing electronic apparatus to detect the sign of said duobinary signal at the center sample;
f. electronically generating a digital timing correction signal in accordance with the detected sign of the center sample relative to the signs of the other two samples when a ±1, 0, ∓1 sequence is detected;

g. employing electronic apparatus to integrate said digital timing correction signal over a substantial number of sequences; and h. applying said integrated timing correction signal to said electronic apparatus for generating said clock signal to vary the frequency of said clock signal.

11. The method of claim 10, comprising the farther step of electronically generating a self-cancelling digital timing correction signal whenever the detected sequence of samples is other than ±1, 0, ∓1.

12. The method of claim 11, in which said digital timing correction signal when generated consists of a full-bit pulse when the second and third samples of said three-sample sequence are of opposite signs, and said sequence is ±1, 0, ∓1; a half-bit pulse when said sequence is other than ±1, 0, ∓1; and no pulse when said second and third samples are of the same sign, and said sequence is ±1, 0, ∓1.

13. The method of claim 11, comprising the further step of also electronically generating said self-cancelling digital timing signal whenever the first and last samples of a sequence are of the same sign.

* * * * *